United States Patent
Kreis et al.

(10) Patent No.: US 11,247,720 B2
(45) Date of Patent: Feb. 15, 2022

(54) STEER-BY-WIRE STEERING SYSTEM FOR A VEHICLE, AND METHOD FOR OPERATING A STEER BY-WIRE STEERING SYSTEM

(71) Applicant: Volkswagen Aktiengesellschaft, Wolfsburg (DE)

(72) Inventors: Christopher Kreis, Braunschweig (DE); Tobias Rüger, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 192 days.

(21) Appl. No.: 16/786,056

(22) Filed: Feb. 10, 2020

(65) Prior Publication Data
US 2020/0262473 A1    Aug. 20, 2020

(30) Foreign Application Priority Data
Feb. 15, 2019    (DE) ...................... 10 2019 202 091.7

(51) Int. Cl.
*B62D 6/00*    (2006.01)
*B62D 5/04*    (2006.01)
(Continued)

(52) U.S. Cl.
CPC .......... *B62D 5/0463* (2013.01); *B60R 16/027* (2013.01); *B62D 5/006* (2013.01);
(Continued)

(58) Field of Classification Search
CPC .... B62D 5/0463; B62D 5/006; B62D 5/0466; B62D 5/0472; B62D 6/002; B62D 6/008;
(Continued)

(56) References Cited

U.S. PATENT DOCUMENTS

| | | | |
|---|---|---|---|
| 6,219,604 B1 * | 4/2001 | Dilger .................... | B62D 6/003 180/422 |
| 6,879,118 B2 * | 4/2005 | Cao ........................ | B62D 5/092 180/443 |

(Continued)

FOREIGN PATENT DOCUMENTS

| | | | | |
|---|---|---|---|---|
| DE | 19921307 A1 | 11/2000 | ............... | B62D 5/00 |
| DE | 10051864 A1 | 4/2002 | ............... | B62D 5/04 |

(Continued)

OTHER PUBLICATIONS

German Office Action, Application No. 102019202091.7, 5 pages, dated Oct. 16, 2019.

*Primary Examiner* — Shardul D Patel
(74) *Attorney, Agent, or Firm* — Slayden Grubert Beard PLLC

(57) ABSTRACT

A steer-by-wire steering system for a vehicle is disclosed, comprising a steering wheel unit, connected with a wheel unit. The steering wheel unit has a steering wheel angle sensor, a steering wheel actuator for setting a steering wheel target torque, and a steering wheel controller for actuating the steering wheel actuator. The wheel unit has a steering sensor for capturing at least one actual steering value, a wheel actuator for setting a target steering value, and a wheel controller. The wheel controller is designed to calculate a virtual torsion rod torque based on the target steering value and the actual steering value, to actuate the wheel actuator based on the calculated virtual torsion rod torque, and to transfer the calculated virtual torsion rod torque to the steering wheel unit. The steering wheel controller is designed to calculate the steering wheel target torque based on the transferred virtual torsion rod torque.

20 Claims, 3 Drawing Sheets

(51) Int. Cl.
  *B60R 16/027* (2006.01)
  *B62D 5/00* (2006.01)
  *B62D 6/10* (2006.01)
  *B62D 15/02* (2006.01)

(52) U.S. Cl.
  CPC ......... B62D 5/0466 (2013.01); B62D 5/0472 (2013.01); B62D 6/002 (2013.01); B62D 6/008 (2013.01); B62D 6/10 (2013.01); B62D 15/0225 (2013.01)

(58) Field of Classification Search
  CPC ...... B62D 6/10; B62D 15/0225; B62D 5/001; B62D 6/00; B60R 16/027
  USPC .......................................................... 701/41
  See application file for complete search history.

(56) References Cited

U.S. PATENT DOCUMENTS

| | | | | |
|---|---|---|---|---|
| 8,249,777 | B2* | 8/2012 | Greul | B62D 6/008 701/41 |
| 2004/0016294 | A1* | 1/2004 | Sugitani | B60W 40/101 73/146 |
| 2004/0088093 | A1* | 5/2004 | Yao | B62D 6/008 701/44 |
| 2004/0262072 | A1* | 12/2004 | Hara | B62D 5/003 180/402 |
| 2007/0162205 | A1* | 7/2007 | Bohm | B62D 5/0463 701/41 |
| 2007/0205040 | A1* | 9/2007 | Miyasaka | B62D 5/001 180/444 |
| 2018/0297629 | A1* | 10/2018 | Wang | B62D 5/0424 |
| 2018/0346021 | A1* | 12/2018 | Wang | B62D 6/002 |
| 2019/0047618 | A1* | 2/2019 | Hulten | B62D 6/008 |

FOREIGN PATENT DOCUMENTS

| | | | |
|---|---|---|---|
| DE | 10204955 A1 | 8/2002 | ............... B62D 5/04 |
| DE | 102006031061 A1 | 1/2008 | ............... B62D 5/04 |
| DE | 102009000638 A1 | 8/2010 | ............... B62D 6/00 |
| DE | 102017203456 A1 | 9/2018 | ............... B62D 5/04 |
| EP | 2614996 A1 | 7/2013 | ........... B60R 16/023 |

* cited by examiner

STEER-BY-WIRE STEERING SYSTEM FOR A VEHICLE, AND METHOD FOR OPERATING A STEER BY-WIRE STEERING SYSTEM

CROSS-REFERENCE TO RELATED APPLICATIONS

This application claims priority to German Patent Application No. DE 10 2019 202 091.7, filed on Feb. 15, 2019 with the German Patent and Trademark Office. The contents of the aforesaid Patent Application are incorporated herein for all purposes.

TECHNICAL FIELD

The invention relates to a steer-by-wire steering system for a vehicle, and a method for operating a steer-by-wire steering system.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Electromechanical steering systems are used in vehicles, in particular motor vehicles. In this case in addition to a mechanical link between a steering wheel and steerable wheels depending on steering torque on the steering wheel, support torque is applied by a wheel actuator. If the wheel actuator fails, the vehicle can still be steered by the mechanical link. The steering torque is captured in this case in the form of torsion rod torque by means of a torsion rod and used as an input value for a steering force support system that calculates from this the support torque to be applied by the wheel actuator.

Furthermore, steer-by-wire steering systems are known in which there is no longer any mechanical connection between the steering wheel and the steerable wheels of the vehicle. These steer-by-wire steering systems comprise a steering wheel unit and a wheel unit that are connected to each other by means of a communication link. A captured steering movement of the steering wheel is transmitted to the wheels by means of a wheel actuator such as an electric motor. To enable haptic feedback from the wheels to the steering wheel and thereby a realistic steering sensation for the driver even without the mechanical connection, the steering wheel unit comprises a steering wheel actuator such as an electric motor through which the steering wheel can be accelerated and braked by applying a corresponding torque.

A steering system with at least one wheel actuator and at least one steering wheel actuator is known from DE 199 21 307 A1, wherein a rule deviation between the setpoint and a controlled variable is forwarded via the steering wheel to the driver. A steer-by-wire steering system is also known from DE 100 51 864 A1 that forwards a rule deviation via the steering wheel to the driver.

SUMMARY

An object of the invention is to improve a steer-by-wire steering system and a method for operating a steer-by-wire steering system.

The object is achieved by a steer-by-wire steering system having the features of the independent apparatus claim and a method having the features of the independent method claim. Embodiments are described in the dependent claims and the following description.

In a first exemplary aspect, a steer-by-wire steering system for a vehicle is provided comprising a steering wheel unit, a wheel unit and a communication link between the steering wheel unit and the wheel unit, wherein the steering wheel unit has a steering wheel angle sensor for capturing a steering wheel angle of a steering wheel of the vehicle, a steering wheel actuator for setting a steering wheel target torque on the steering wheel, and a steering wheel controller for actuating the steering wheel actuator, at least on the basis of the steering wheel target torque, and wherein the wheel unit has a steering sensor for capturing at least one actual steering value, at least one wheel actuator for setting a target steering value, and a wheel controller for actuating the wheel actuator, wherein the wheel controller is furthermore configured to calculate a virtual torsion rod torque based on the target steering value and the actual steering value, and to actuate the wheel actuator based on the calculated virtual torsion rod torque and to transfer the calculated virtual torsion rod torque via the communication link to the steering wheel unit, wherein the steering wheel controller is furthermore configured to calculate the steering wheel target torque based on the transferred virtual torsion rod torque.

In a further exemplary aspect, a method for operating a steer-by-wire steering system is provided, wherein the steer-by-wire steering system comprises a steering wheel unit, a wheel unit, and a communication link between the steering wheel unit and the wheel unit, wherein the steering wheel unit has a steering wheel angle sensor for capturing a steering wheel angle of a steering wheel of the vehicle, a steering wheel actuator for setting a steering wheel target torque on the steering wheel, and a steering wheel controller for actuating the steering wheel actuator at least on the basis of the steering wheel target torque, and wherein the wheel unit has a steering sensor for capturing at least one actual steering value, at least one wheel actuator for setting a target steering value, and a wheel controller for actuating the wheel actuator, wherein the following steps are executed: using the wheel controller, calculating a virtual torsion rod torque on the basis of the target steering value and the actual steering value; using the wheel controller, actuating the wheel actuator on the basis of the calculated virtual torsion rod torque; transferring the calculated virtual torsion rod torque via the communication link to the steering wheel unit; using the steering wheel controller, calculating the steering wheel target torque on the basis of the transferred virtual torsion rod torque.

The details of one or more embodiments are set forth in the accompanying drawings and the description below. Other features will be apparent from the description, drawings, and from the claims.

DETAILED DESCRIPTION

Figure 1:
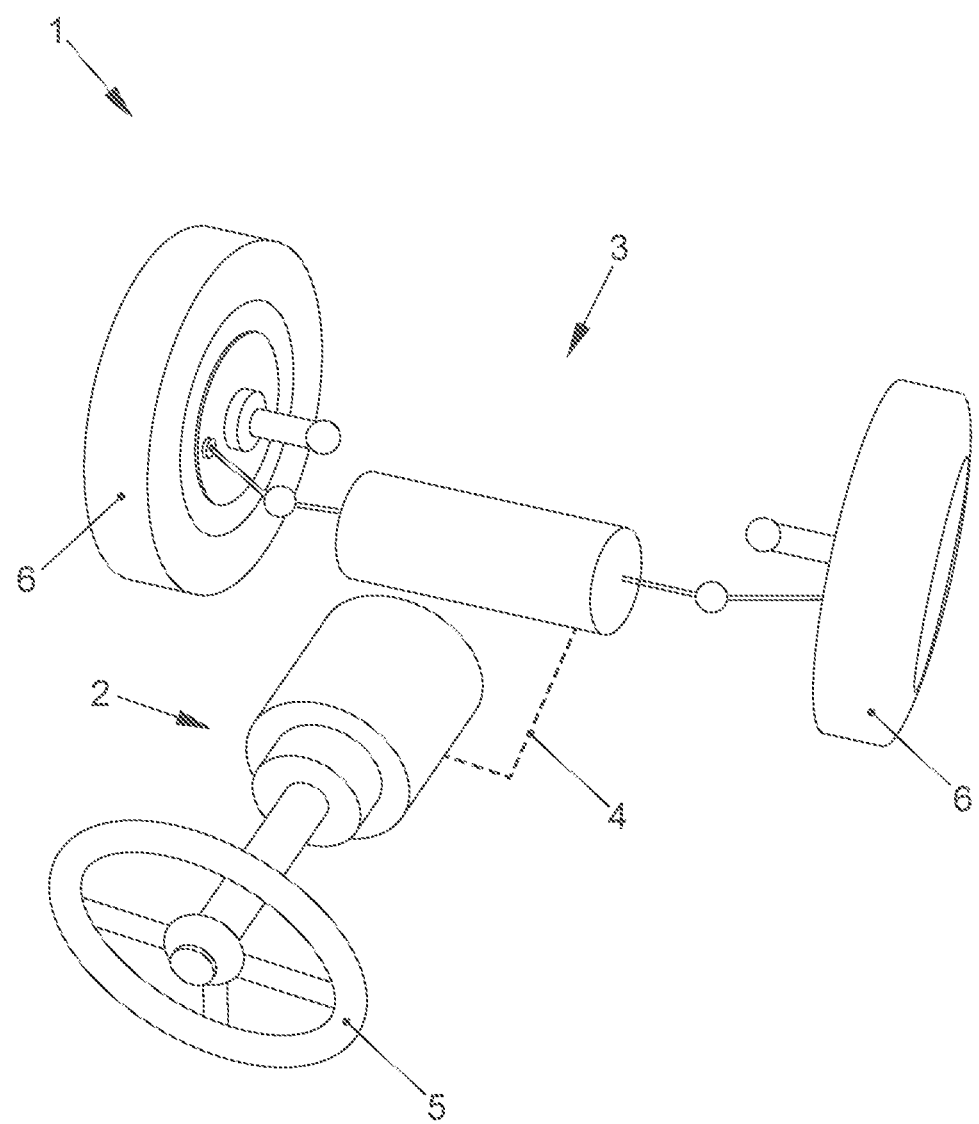
FIG. 1 shows a schematic representation of a steer-by-wire steering system.

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

As discussed in the preceding and in a first exemplary aspect, a steer-by-wire steering system for a vehicle is provided comprising a steering wheel unit, a wheel unit and a communication link between the steering wheel unit and the wheel unit. The steering wheel unit has a steering wheel angle sensor for capturing a steering wheel angle of a steering wheel of the vehicle, a steering wheel actuator for setting a steering wheel target torque on the steering wheel, and a steering wheel controller for actuating the steering wheel actuator, at least on the basis of the steering wheel target torque. The wheel unit has a steering sensor for capturing at least one actual steering value, at least one wheel actuator for setting a target steering value, and a wheel controller for actuating the wheel actuator. The wheel controller is furthermore configured to calculate a virtual torsion rod torque based on the target steering value and the actual steering value, and to actuate the wheel actuator based on the calculated virtual torsion rod torque and to transfer the calculated virtual torsion rod torque via the communication link to the steering wheel unit. The steering wheel controller is furthermore configured to calculate the steering wheel target torque based on the transferred virtual torsion rod torque.

A benefit of the aspects described herein is that a virtual torsion rod torque is calculated and provided. The calculated virtual torsion rod torque is then used to control the wheel actuator. This makes it possible to be able to transfer and re-use structures of steering force support apparatuses (hardware and/or software-based), already known from and used in classic electromechanical steering, that function as input values with torsion rod torques. This may save development costs and effort. Instead of torsion rod torque measured from a torsion rod, the steering force support apparatus provides the calculated virtual torsion rod torque as an input value. The steering force support apparatus may then calculate an engine torque to be applied by means of the wheel actuator on the basis of the virtual torsion rod torque and known characteristic maps.

Furthermore, the calculated virtual torsion rod torque may in some embodiments additionally be transferred to the steering wheel unit where it serves as a basis for calculating the steering wheel target torque. By returning the virtual torsion rod torque, particularly good haptic feedback of the steering system may be provided. The virtual torsion rod torque is implicitly within the steering system and makes it possible to dispense with complex physical models as used in the prior art, for example in the form of a rack monitor. All of the information that determines a steering sensation in a classic electromechanical steering system is included here in the virtual torsion rod torque. This includes both road unevenness as well as mechanical system friction. Consequently, a particularly natural haptic feedback in the steering wheel that is familiar to the driver and therefore especially pleasant may be provided.

The actual steering value and the target steering value may for example be used in the form of an actual steering angle and a target steering angle, or also in the form of a rack actual position and a rack target position. In this case, it is also possible to perform conversions between the different representations, for example a rack position may be converted into a steering angle and vice versa.

In some embodiments, it is provided that a captured current steering wheel angle and a steering wheel angle speed derived from steering wheel angles are transferred by the steering wheel unit via the communication link to the wheel unit. The target steering value, such as a target steering angle or target rack position, is calculated therefrom in the wheel unit. The wheel unit transfers, e.g., the calculated virtual torsion rod torque to the steering wheel unit.

Parts of the steer-by-wire steering system, such as the steering wheel controller and/or the wheel controller, may be designed individually or assembled as a combination of hardware and software, for example as program code that is executed in a micro-controller or a microprocessor.

In some embodiments it is provided that the wheel controller is designed so that virtual torsion rod torque is calculated on the basis of an angle difference between a target steering angle specified by the steering wheel unit through a transferred steering wheel angle and an actual steering angle derived from the captured actual steering value. The virtual torsion rod torque in this case is proportional to the angle difference, wherein a proportionality constant is dependent on a rigidity of the virtual torsion rod (in the simplest case: virtual torsion rod torque=rigidity*angle difference). The rigidity in this case may be specified; for example, empirically determined values for the rigidity or values of torsion rods in known electromechanical steering systems may be used. A manual specification or selection by a driver of the vehicle is also possible in principle. The driver may for example thereby select a preference for a rigidity that then acts on the steering behavior and on the haptic feedback. This makes it possible to calculate the virtual torsion rod torque very easily and quickly. The rigidity is, e.g., selected as high as possible taking into account the condition that the control loop is working in a stable manner.

In other embodiments it is provided that the wheel controller is furthermore designed to calculate a damping component of the virtual torsion rod torque on the basis of an angle speed difference between a steering wheel angle speed transferred by the steering wheel unit and a steering wheel angle speed derived from captured actual steering values. The angle speed difference expresses a relative speed in this context. The damping component corresponds to friction arising in the steering system. In the simplest case, the damping torque is proportional (single proportionality factor) to this relative speed. Alternative to a constant proportionality factor, a characteristic may also be used to take into account nonlinear effects. By taking into account the damping component, the haptic feedback may be further improved.

Further embodiments propose that the wheel controller is furthermore designed to transfer the calculated damping component and a steering wheel angle speed used by the wheel controller to the steering wheel unit, wherein the steering wheel unit is furthermore designed to correct the transferred virtual torsion rod torque on the basis of the transferred damping component and a steering wheel angle speed derived from currently captured steering wheel angles and the transferred utilized steering wheel angle speed. In this case, it is, e.g., provided that the transferred damping component is updated in the steering wheel controller on the basis of a current steering wheel angle. This allows delays to be compensated that arise from transfer and calculation. A difference between the steering wheel angle speeds, i.e., a relative angle speed, may be calculated from a utilized steering wheel angle speed transferred by the wheel unit to the steering wheel unit and a current steering wheel angle speed determined in the steering wheel unit. As already described in the preceding, the damping component may be calculated from this in the steering wheel unit. The transferred damping component and the damping component calculated in the steering wheel unit may, e.g., be compared with each other in order to then provide an updated damping component of the damping torque. The updated damping component may then for example be used to correct the virtual torsion rod torque. The benefit is that this may reduce a control deviation in a steering wheel torque regulator of the steering wheel controller used to regulate the steering wheel target torque to be applied by the steering wheel actuator. The steering wheel torque regulator may then be better parameterized within its stability limits. In particular, this procedure may reduce a dead time of the steer-by-wire steering system so that a greater amplification may be set in the steer-by-wire steering system functioning as a control loop which reduces a control deviation. This may lead to an improved steering behavior, a reduced phase delay between the steering wheel and a movement of the wheels, and to a steadier and smoothed signal profile of the torque on the steering wheel. This may improve haptic feedback in the steering wheel and accordingly the steering sensation experienced by the driver. For example, this may replicate the steering sensation of a conventional electromechanical steering system. In this case, the utilized steering wheel angle speed may, e.g., be the potentially revised steering wheel angle speed that was used by the wheel controller for regulating.

In some embodiments, it is provided that the steering wheel unit is furthermore designed to determine each transmission delay occurring before the transfer and to also transfer each determined transmission delay, wherein the wheel unit is furthermore designed to at least interpolate the steering wheel angle transferred by the steering wheel unit and/or transferred steering wheel angle speeds on the basis of each transferred transmission delay, and/or the wheel unit is furthermore designed to determine each transmission delay occurring before transfer and to also transfer each determined transmission delay, wherein the steering wheel unit is furthermore designed to at least interpolate virtual torsion rod torques transferred by the wheel unit and/or transferred utilized steering wheel angle speeds on the basis of each transferred transmission delay. "Interpolation" in this case designates in particular interpolation at a given point in time, or respectively a given point in time within a (regular) timeframe. The transmission delay comprises the entire signal runtime from capturing, or respectively calculating a value to be transferred until the point in time at which the value is transferred in the form of a message via the communication link. The transmission delay may for example be ascertained by capturing, or respectively reading out timestamps for a system time of the respective controls. To accomplish this, a difference is formed from the timestamps at a transfer time and a provision time at which the transferred value was calculated or captured. It may be provided in some embodiments that the transmission delay is sent with the same message, wherein the transmission delay is estimated in this case since the real transmission time can only be provided after a transfer of the message. It may however also be provided that the transmission delay is only transferred with the next, subsequent message. On a respective opposite side, each transmitted value is then interpolated on the basis of each detected transmission delay so that the values exist in a regular timeframe and fluctuations may be compensated. Interpolation yields a smooth and undistorted progression of the respective values so that the values may be further processed in the steering wheel controller, or respectively the wheel controller with a smoothed and undistorted signal. Furthermore, this may allow a use of filters for signal smoothing to be discarded that always lead to a time delay that has negative effects on stability, steering behavior and phasing of the steering system. In the simplest case, a linear interpolation is used. However, more complex interpolation methods may also be used such as interpolation using higher order polynomials, partial and piecewise interpolation (such as spline interpolation), etc.

In some embodiments, it is provided that the steering wheel controller is designed to actuate the steering wheel actuators to actively reset the steering wheel. In this case it is for example envisioned for torque to always be applied to the steering wheel that guides the steering wheel back into a straight-ahead or respectively middle position.

Other embodiments provide that the communication link is configured as a controller area network (CAN) bus, or a FlexRay bus or a CAN FD bus. For example, some embodiments provide that the communication link is configured as a CAN FD bus. Since this provides a high data transmission rate, haptic feedback of the steering system may be improved since current virtual torsion rod torques may be transmitted with a high clock rate.

In some embodiments it is provided that the wheel controller comprises a friction compensation apparatus, and/or an inertia compensation apparatus, and/or a stability and dynamics apparatus. For example, existing structures from conventional electromechanical steering systems can be transferred in this case given the described steer-by-wire steering system, which can save development costs.

In some embodiments it is provided that the wheel controller is furthermore designed to calculate the virtual torsion rod torque on the basis of at least one additional input variable. For example, it may be provided to adapt a rigidity, and/or a damping, or respectively a damping constant for the model of the virtual torsion rod used to calculate the virtual torsion rod torque. This allows the steering behavior and the haptic feedback to be influenced in a particularly dynamic way. For example a vehicle speed, a road friction or a selection of a driving mode or sports setting, e.g., for adapting a response behavior and/or a steering sensation may serve as input variables.

In a further exemplary aspect, a method for operating a steer-by-wire steering system is provided, wherein the steer-by-wire steering system comprises a steering wheel unit, a wheel unit, and a communication link between the steering wheel unit and the wheel unit, wherein the steering wheel unit has a steering wheel angle sensor for capturing a steering wheel angle of a steering wheel of the vehicle, a steering wheel actuator for setting a steering wheel target torque on the steering wheel, and a steering wheel controller for actuating the steering wheel actuator at least on the basis of the steering wheel target torque, and wherein the wheel unit has a steering sensor for capturing at least one actual steering value, at least one wheel actuator for setting a target steering value, and a wheel controller for actuating the wheel actuator, wherein the following steps are executed: using the wheel controller, calculating a virtual torsion rod torque on the basis of the target steering value and the actual steering value; using the wheel controller, actuating the wheel actuator on the basis of the calculated virtual torsion rod torque; transferring the calculated virtual torsion rod torque via the communication link to the steering wheel unit; using the steering wheel controller, calculating the steering wheel target torque on the basis of the transferred virtual torsion rod torque.

The method of this aspect has the same benefits as the corresponding features of the steer-by-wire steering system.

In the following, the invention will be explained in greater detail based on additional exemplary embodiments and with reference to the drawings.

Specific references to components, process steps, and other elements are not intended to be limiting. Further, it is understood that like parts bear the same or similar reference numerals when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

BRIEF DESCRIPTION

FIG. 1 shows a schematic representation of a steer-by-wire steering system 1 for a vehicle. The steer-by-wire steering system 1 comprises a steering wheel unit 2, a wheel unit 3 and a communication link 4. The steering wheel unit 2 and the wheel unit 3 may communicate with each other through the communication link 4 and for example exchange setpoints and actual values. There is no mechanical link between a steering wheel 5 and the wheels 6.

Figure 2:
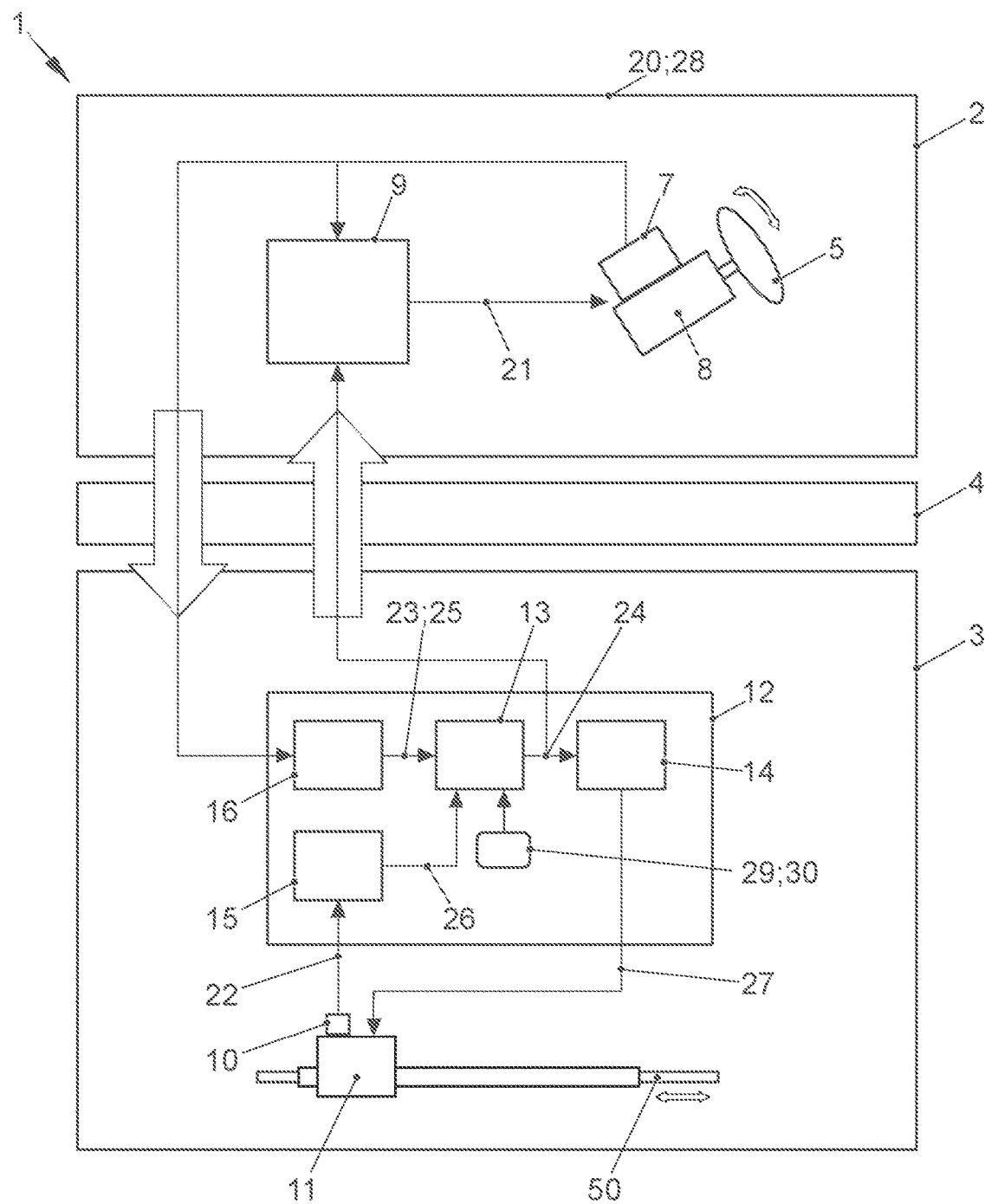
FIG. 2 shows a schematic representation of an embodiment of the steer-by-wire steering system for a vehicle.

FIG. 2 shows a schematic representation of an embodiment of the steer-by-wire steering system 1 for a vehicle. The steer-by-wire steering system 1 comprises a steering wheel unit 2, a wheel unit 3 and a communication link 4. The communication link 4 may be configured in the form of a CAN FD bus.

The steering wheel unit 2 has a steering wheel angle sensor 7 for capturing a steering wheel angle 20 of a steering wheel 5 of the vehicle, a steering wheel actuator 8 for setting a steering wheel target torque 21 on the steering wheel 5, and a steering wheel controller 9 for actuating the steering wheel actuator 8, at least on the basis of the steering wheel target torque 21. Through the communication link 4, the steering wheel unit 2 transfers the captured steering wheel angle 20 and a steering wheel angle speed 28 derived therefrom.

The wheel unit 3 has a steering sensor 10 for capturing at least one actual steering value 22, at least one wheel actuator 11 for setting a target steering value 23, and a wheel controller 12 for actuating the wheel actuator 11. A steering angle of the wheels 6 (FIG. 1) is set in the shown exemplary embodiment by means of a rack 50 that for example may be removed and positioned through a pinion by the wheel actuator 11. For example a rack position or a steering angle may be captured as the actual steering value 22 and supplied to the wheel controller 12. The specific embodiment in which steering of the wheels is effectuated by means of a rack 50 is only chosen as an example. In principle, a steering angle of the wheels can also be set in another way.

The wheel controller 12 furthermore comprises a torsion rod torque calculating apparatus 13 and a steering force support apparatus 14. The torsion rod torque calculating apparatus 13 calculates a virtual torsion rod torque 24 on the basis of the target steering value 23 and the actual steering value 22. In this case, a rigidity 29 of the virtual torsion rod value is specified from outside. Alternatively, the rigidity 29 may also be calculated or derived by the torsion rod torque calculating apparatus 13 on the basis of at least one additional input variable 30.

The wheel controller 12 calculates the virtual torsion rod torque 24 in this case in particular on the basis of an angle difference between a target steering angle 25 specified by the steering wheel unit 2 through a transferred steering wheel angle 20 and an actual steering angle 26 derived from the captured actual steering value 22. The steering wheel angle 20 is converted into the target steering angle 25 in a conversion apparatus 15 configured for this. The actual steering value 22 is converted into the actual steering angle 26 in a conversion apparatus 16 configured for this.

Through the steering force support apparatus 14, the wheel controller 12 then actuates the wheel actuator 11 by outputting a target engine torque 27. This is accomplished on the basis of the calculated virtual torsion rod torque 24. This allows already existing structures of a steering force support as are known from classic electromechanical steering systems to be reused. For example, performance maps of a classic electromechanical steering system may be retained. This makes it possible to reuse already existing structures in a cost-saving manner.

Moreover, the wheel controller 12 transfers the calculated virtual torsion rod torque 24 through the communication link 4 to the steering wheel unit 2. The steering wheel controller 9 of the steering wheel unit 2 then calculates the steering wheel target torque 21 on the basis of the transferred virtual torsion rod torque 24. Since the control deviation of the steering system 1 expressed in the form of the virtual torsion rod torque 24 comprises all the information of the steering system 1, this may improve haptic feedback in the steering wheel 5.

It may be provided that a damping component, or respectively a damping torque of the virtual torsion rod is also calculated from an angle speed difference.

Parts of the steer-by-wire steering system 1, such as the steering wheel controller 9 and/or the wheel controller 12, may be designed individually or assembled as a combination of hardware and software, for example as program code that is executed in a micro-controller or a microprocessor.

Figure 3:
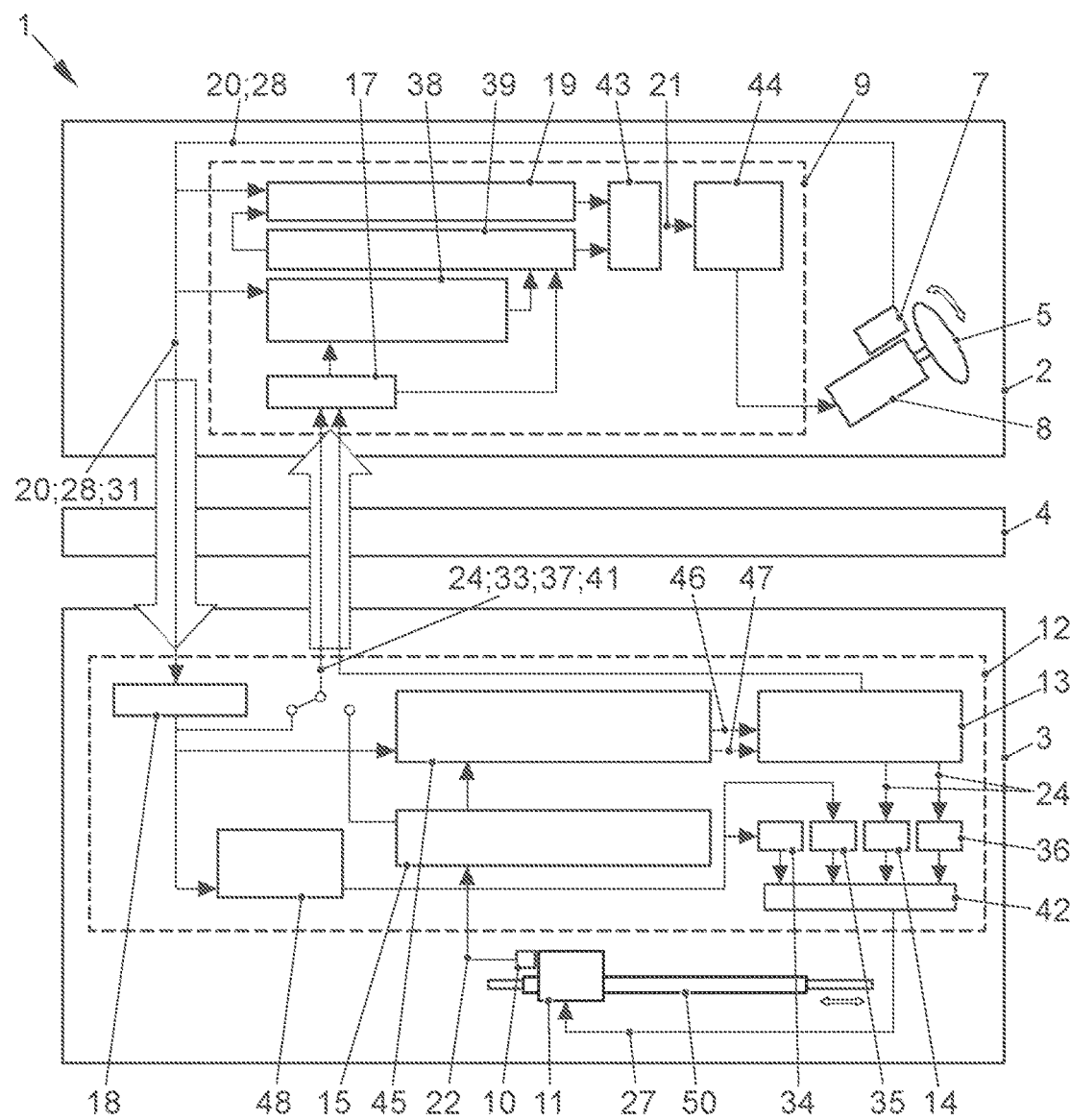
FIG. 3 shows a schematic representation of another embodiment of the steer-by-wire steering system for a vehicle.

FIG. 3 shows a schematic representation of another embodiment of the steer-by-wire steering system 1 for a vehicle. The shown steering system 1 is constructed in principle like the embodiment shown in FIG. 2; the same reference signs designate the same features and terms.

An angle difference 46 between a target steering angle specified by the steering wheel unit 2 through a transferred steering wheel angle 20 and an actual steering angle derived from the captured actual steering value 22 and an associated angle speed difference 47 are calculated by means of a difference calculating apparatus 45 in the shown embodiment. The differences 46, 47 are then supplied to the torsion rod torque calculating apparatus 13 to calculate the virtual torsion rod torque 24.

It may be provided that a damping component, or respectively a damping torque of the virtual torsion rod is also calculated in the torsion rod torque calculating apparatus 13 from the angle speed difference 47. It is then provided that the wheel controller 3 transfers the calculated damping component 37 and a steering wheel angle speed 33 used by the wheel controller 3 to the steering wheel unit 2 via the communication link 4. The steering wheel unit 2 furthermore has a corrected value calculating apparatus 38 and a correcting apparatus 39 that correct the transferred virtual torsion rod torque 24 on the basis of the transferred damping component 37 and the steering wheel angle speed 28 derived from the currently captured steering wheel angles 20 and the transferred, utilized steering wheel angle speed 33.

In the shown embodiment, the steering wheel controller 9 and wheel controller 12 furthermore each have interpolation apparatuses 17, 18. The interpolation apparatus 18 of the wheel controller 12 interpolates steering wheel angles 20 transferred by the steering wheel unit 2 to the wheel unit 3 and transferred steering wheel angle speeds 28 on the basis of a determined transmission delay 31 at specified, for example regularly arranged points in time. The interpolation may for example be a linear interpolation. However, other interpolation methods may also be used. The transmission delay 31 is always determined by the steering wheel controller 2 and also transferred to the wheel unit 3. The interpolation apparatus 17 of the steering wheel controller 9 interpolates virtual torsion rod torques 24 transferred by the wheel unit 3 to the steering wheel unit 2 and transferred utilized steering wheel angle speeds 33 on the basis of a determined transmission delay 41 at specified, for example regularly arranged points in time. The transmission delay 41 is always determined by the wheel controller 3 and also transferred to the steering wheel unit 2. Temporal fluctuations in processing and transferring may be compensated by interpolating the respective values so that a smoothed signal flow may be provided. This yields improved steering behavior and in particular improved haptic feedback in the steering wheel 5.

Furthermore it may be provided that the steering wheel controller has a resetting apparatus 19 that actuates the steering wheel actuator 8 to actively reset the steering wheel 5, in particular in the direction of a straight-ahead or middle position.

The torques that are provided by the resetting apparatus 19 and the correcting apparatus 39 are added in a summer 43 and set by means of a steering wheel torque regulator 44 in the form of a steering wheel target torque 21 on the steering wheel actuator 8. Furthermore it may be provided that the wheel controller comprises a friction compensation apparatus 34, an inertia compensation apparatus 35, and/or a stability and dynamics apparatus 36. These apparatuses 34, 35, 36 are known per se from classic electromechanical steering systems and function in a known manner in the steer-by-wire steering system 1. The respective output signals, i.e., each calculated target engine torque for the wheel actuator 11, are added up in a summer 42 into a target engine torque 27. Input signals for the friction compensation apparatus 34 and the inertia compensation apparatus 35 may be derived from the steering wheel angle speed 28 transferred by the steering wheel unit 2 to the wheel unit 3 by means of a conversion apparatus 48, for example in order to provide a rack speed.

LIST OF REFERENCE NUMERALS

1 Steer-by-wire steering system
2 Steering wheel unit
3 Wheel unit
4 Communication link
5 Steering wheel
6 Wheel
7 Steering wheel angle sensor
8 Steering wheel actuator
9 Steering wheel controller
10 Steering sensor
11 Wheel actuator
12 Wheel controller
13 Torsion rod torque calculating apparatus
14 Steering force support apparatus
15 Conversion apparatus
16 Conversion apparatus
17 Interpolation apparatus
18 Interpolation apparatus
19 Resetting apparatus
20 Steering wheel angle
21 Steering wheel target torque
22 Actual steering value
23 Target steering value
24 Virtual torsion rod torque
25 Target steering angle
26 Actual steering angle
27 Target engine torque
28 Steering wheel angle speed
29 Rigidity
30 Input variable
31 Transmission delay
33 Utilized steering wheel angle speed
34 Friction compensation apparatus
35 Inertia compensation apparatus
36 Stability and dynamics apparatus
37 Damping component
38 Corrected value calculating apparatus
39 Correcting apparatus
41 Transmission delay
42 Summer
43 Summer
44 Steering wheel torque regulator
45 Difference calculation apparatus
46 Angle difference
47 Angle speed difference
48 Conversion apparatus
50 Rack The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A steer-by-wire steering system for a vehicle, comprising:
a steering wheel unit,
a wheel unit, and
a communication link between the steering wheel unit and the wheel unit;
wherein the steering wheel unit has a steering wheel angle sensor for capturing a steering wheel angle of a steering wheel of the vehicle,
a steering wheel actuator for setting a steering wheel target torque on the steering wheel, and
a steering wheel controller for actuating the steering wheel actuator, at least on the basis of the steering wheel target torque; and
wherein the wheel unit has a steering sensor for capturing at least one actual steering value, at least one wheel actuator for setting a target steering value, and a wheel controller for actuating the wheel actuator, wherein the wheel controller is furthermore configured to calculate a virtual torsion rod torque based on the target steering value and the actual steering value, and to actuate the wheel actuator based on the calculated virtual torsion rod torque and to transfer the calculated virtual torsion rod torque via the communication link to the steering wheel unit, wherein the steering wheel controller is furthermore configured to calculate the steering wheel target torque based on the transferred virtual torsion rod torque.

2. The steer-by-wire steering system of claim 1, wherein the wheel controller is configured so that the virtual torsion rod torque is calculated on the basis of an angle difference between a target steering angle specified by the steering wheel unit through a transferred steering wheel angle and an actual steering angle derived from the captured actual steering value.

3. The steer-by-wire steering system of claim 2, wherein the wheel controller is furthermore configured to calculate a damping component of the virtual torsion rod torque on the basis of an angle speed difference between a steering wheel angle speed transferred by the steering wheel unit and a steering wheel angle speed derived from captured actual steering values.

4. The steer-by-wire steering system of claim 2, wherein the steering wheel unit is furthermore configured to determine each transmission delay occurring before the transfer and to also transfer each determined transmission delay, wherein the wheel unit is furthermore configured to at least interpolate the steering wheel angle transferred by the steering wheel unit and/or transferred steering wheel angle speeds on the basis of each transferred transmission delay, and/or the wheel unit is furthermore configured to determine each transmission delay occurring before transfer and to also transfer each determined transmission delay, wherein the steering wheel unit is furthermore designed to at least interpolate virtual torsion rod torques transferred by the wheel unit and/or transferred utilized steering wheel angle speeds on the basis of each transferred transmission delay.

5. The steer-by-wire steering system of claim 2, wherein the steering wheel controller is configured to actuate the steering wheel actuator to actively reset the steering wheel.

6. The steer-by-wire steering system of claim 2, wherein the communication link is configured as a controller area network (CAN) bus, or a FlexRay bus or a CAN FD bus.

7. The steer-by-wire steering system of claim 1, wherein the wheel controller is furthermore configured to calculate a damping component of the virtual torsion rod torque on the basis of an angle speed difference between a steering wheel angle speed transferred by the steering wheel unit and a steering wheel angle speed derived from captured actual steering values.

8. The steer-by-wire steering system of claim 7, wherein the steering wheel unit is furthermore configured to determine each transmission delay occurring before the transfer and to also transfer each determined transmission delay, wherein the wheel unit is furthermore configured to at least interpolate the steering wheel angle transferred by the steering wheel unit and/or transferred steering wheel angle speeds on the basis of each transferred transmission delay, and/or the wheel unit is furthermore configured to determine each transmission delay occurring before transfer and to also transfer each determined transmission delay, wherein the steering wheel unit is furthermore designed to at least interpolate virtual torsion rod torques transferred by the wheel unit and/or transferred utilized steering wheel angle speeds on the basis of each transferred transmission delay.

9. The steer-by-wire steering system of claim 7, wherein the wheel controller is furthermore configured to transfer the calculated damping component and a steering wheel angle speed used by the wheel controller to the steering wheel unit, wherein the steering wheel unit is furthermore configured to correct the transferred virtual torsion rod torque on the basis of the transferred damping component and a steering wheel angle speed derived from currently captured steering wheel angles and the transferred utilized steering wheel angle speed.

10. The steer-by-wire steering system of claim 9, wherein the steering wheel unit is furthermore configured to determine each transmission delay occurring before the transfer and to also transfer each determined transmission delay, wherein the wheel unit is furthermore configured to at least interpolate the steering wheel angle transferred by the steering wheel unit and/or transferred steering wheel angle speeds on the basis of each transferred transmission delay, and/or the wheel unit is furthermore configured to determine each transmission delay occurring before transfer and to also transfer each determined transmission delay, wherein the steering wheel unit is furthermore designed to at least interpolate virtual torsion rod torques transferred by the wheel unit and/or transferred utilized steering wheel angle speeds on the basis of each transferred transmission delay.

11. The steer-by-wire steering system of claim 9, wherein the steering wheel controller is configured to actuate the steering wheel actuator to actively reset the steering wheel.

12. The steer-by-wire steering system of claim 7, wherein the steering wheel controller is configured to actuate the steering wheel actuator to actively reset the steering wheel.

13. The steer-by-wire steering system of claim 7, wherein the communication link is configured as a controller area network (CAN) bus, or a FlexRay bus or a CAN FD bus.

14. The steer-by-wire steering system of claim 1, wherein the steering wheel unit is furthermore configured to determine each transmission delay occurring before the transfer and to also transfer each determined transmission delay, wherein the wheel unit is furthermore configured to at least interpolate the steering wheel angle transferred by the steering wheel unit and/or transferred steering wheel angle speeds on the basis of each transferred transmission delay, and/or the wheel unit is furthermore configured to determine each transmission delay occurring before transfer and to also transfer each determined transmission delay, wherein the steering wheel unit is furthermore designed to at least interpolate virtual torsion rod torques transferred by the wheel unit and/or transferred utilized steering wheel angle speeds on the basis of each transferred transmission delay.

15. The steer-by-wire steering system of claim 14, wherein the steering wheel controller is configured to actuate the steering wheel actuator to actively reset the steering wheel.

16. The steer-by-wire steering system of claim 1, wherein the steering wheel controller is configured to actuate the steering wheel actuator to actively reset the steering wheel.

17. The steer-by-wire steering system of claim 1, wherein the communication link is configured as a controller area network (CAN) bus, or a FlexRay bus or a CAN FD bus.

18. The steer-by-wire steering system of claim 1, wherein the wheel controller comprises one or more of a friction compensation apparatus, an inertia compensation apparatus, and a stability and dynamics apparatus.

19. The steer-by-wire steering system of claim 1, wherein the wheel controller is furthermore configured to calculate the virtual torsion rod torque on the basis of at least one additional input variable.

20. A method for operating a steer-by-wire steering system, wherein the steer-by-wire steering system comprises a steering wheel unit, a wheel unit, and a communication link between the steering wheel unit and the wheel unit, wherein the steering wheel unit has a steering wheel angle sensor for capturing a steering wheel angle of a steering wheel of the vehicle, a steering wheel actuator for setting a steering wheel target torque on the steering wheel, and a steering wheel controller for actuating the steering wheel actuator at least on the basis of the steering wheel target torque, and wherein the wheel unit has a steering sensor for capturing at least one actual steering value, at least one wheel actuator for setting a target steering value, and a wheel controller for actuating the wheel actuator, wherein the following steps are executed:

calculating a virtual torsion rod torque on the basis of the target steering value and the actual steering value using the wheel controller;

actuating the wheel actuator based on the calculated virtual torsion rod torque using the wheel controller;

transferring the calculated virtual torsion rod torque via the communication link to the steering wheel unit;

calculating the steering wheel target torque based on the transferred virtual torsion rod torque using the steering wheel controller.

\* \* \* \* \*